United States Patent [19]

Roh

[11] Patent Number: 4,930,618
[45] Date of Patent: Jun. 5, 1990

[54] POWER FREE TRIPLE CONVEYOR

[76] Inventor: Jae Y. Roh, 493, Shinpwong-dong, Saha-ku, Pusan-si, Rep. of Korea

[21] Appl. No.: 290,255

[22] Filed: Dec. 27, 1988

[51] Int. Cl.⁵ ............................................. B65G 13/06
[52] U.S. Cl. .................................. 198/781; 198/783; 198/790
[58] Field of Search ......................... 198/781, 783, 790

[56] References Cited

U.S. PATENT DOCUMENTS

| 4,121,709 | 10/1978 | Gebhardt | 198/781 |
| 4,421,224 | 12/1983 | Dingman | 198/781 |
| 4,503,970 | 3/1985 | Andersson | 198/781 |
| 4,508,212 | 4/1985 | Bolle et al. | 198/781 |
| 4,706,801 | 11/1987 | Vessey | 198/781 |

FOREIGN PATENT DOCUMENTS

| 3222028 | 1/1983 | Fed. Rep. of Germany | 198/781 |
| 0889560 | 12/1981 | U.S.S.R. | 198/781 |
| 0893745 | 12/1981 | U.S.S.R. | 198/781 |

Primary Examiner—David A. Bucci
Assistant Examiner—D. Glenn Dayoan
Attorney, Agent, or Firm—Blakely, Sokoloff, Taylor & Zafman

[57] ABSTRACT

This invention relates to a roller assembly for a power free triple conveyor having an overload release device which includes a sprocket mounted on a shaft through a bearing, a roller separately formed and freely rotated on the sprocket, a plurality of springs resiliently installed within the holes of the roller, a pair of friction plates and snap ring located adjacent to the roller, and a guide rail fixed at the upper portion of the frame. The conveyor can reduce noise and vibration between the drive members in an un-manned robot environment, and transport products quickly and accurately.

4 Claims, 3 Drawing Sheets

POWER FREE TRIPLE CONVEYOR

FIELD AND BACKGROUND OF THE INVENTION

This invention discloses a conveyor roller assembly with overloaded release means which transports products quickly and accurately and reduces noise and vibration of the conveyor. In a conventional conveyor, a plurality of spaced rollers are rotably mounted to a frame and driven by a chain which moves forward on the endless track. Accordingly, the rollers move forward together with the chain to transport each pallet on which a product is loaded. Such transport mechanism makes a lot of noise due to friction among drive members and vibration between the pallet and the roller. The vibration between the drive members raises many problems in an un-manned robot environment. Moreover, the noise annoys workers and deteriorates work atmosphere.

Another prior art discloses a conveyor in which the roller does not move forward with the chain. The roller just revolves at a stationary position to reduce noise and vibration. However, since the roller is formed integrally with the sprocket, revolusion speed of the roller is constant. Therefore, when the conveyor is overloaded, such roller cannot be adjusted to the proper transport condition, thus resulting in improper transport of the products and lower production efficiency.

SUMMARY OF THE INVENTION

It is a principal object of the present invention to provide a roller assembly for a power free triple conveyor which can reduce noise and vibration between the drive members and transport products quickly and accurately.

It is still another object of the present invention to provide a roller assembly for a power free triple conveyor which has overload release means to stop rotation of the roller in case of product overload.

These and other objects and features of the invention will be further explained in the following detailed description and the accompanying drawings.

DETAILED DESCRIPTION OF THE INVENTION

Figure 1:
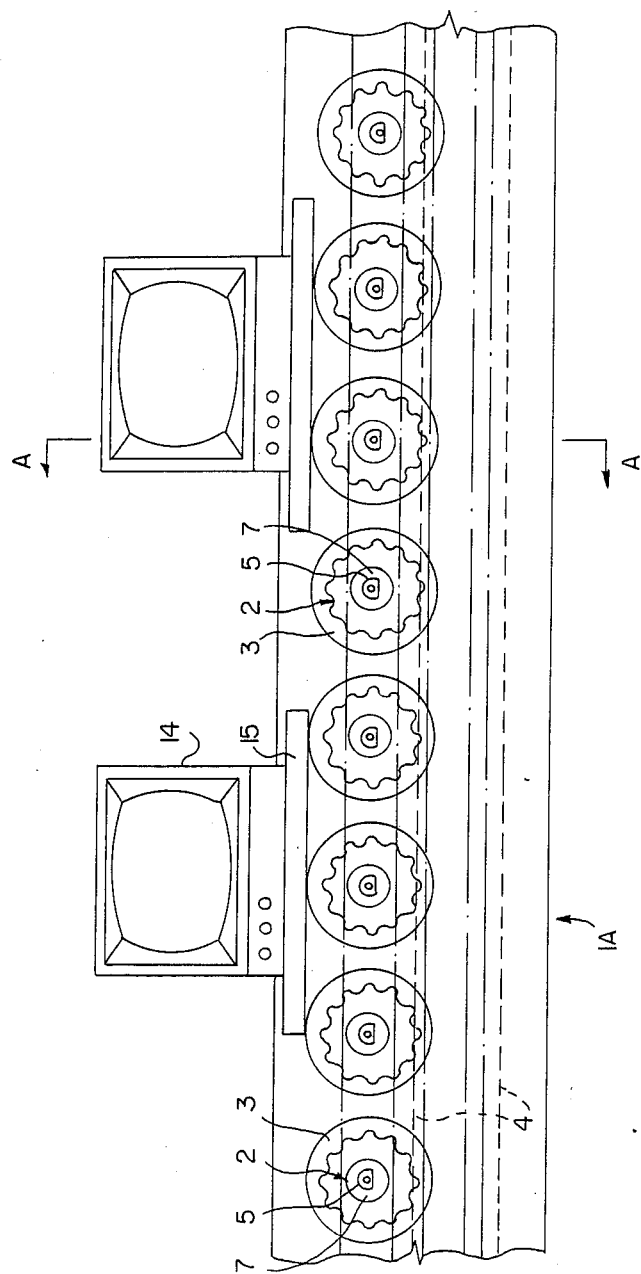
FIG. 1 is a schematic side view illustrating the conveyor line, in accordance with the present invention, to transport products thereon.

Referring to FIG. 1, the shown portion of the conveyor line comprises a pair of spaced apart frames 1a, 1b, (frame 1b not shown) extending longitudinally, a plurality of sprockets 2 arranged at the upper portion of frames 1a, 1b, a plurality of rollers 3 mounted concentrically on the corresponding sprockets 2, and an endless chain 4 which drives each sprocket 2 by power of a motor (not shown).

Figure 2:
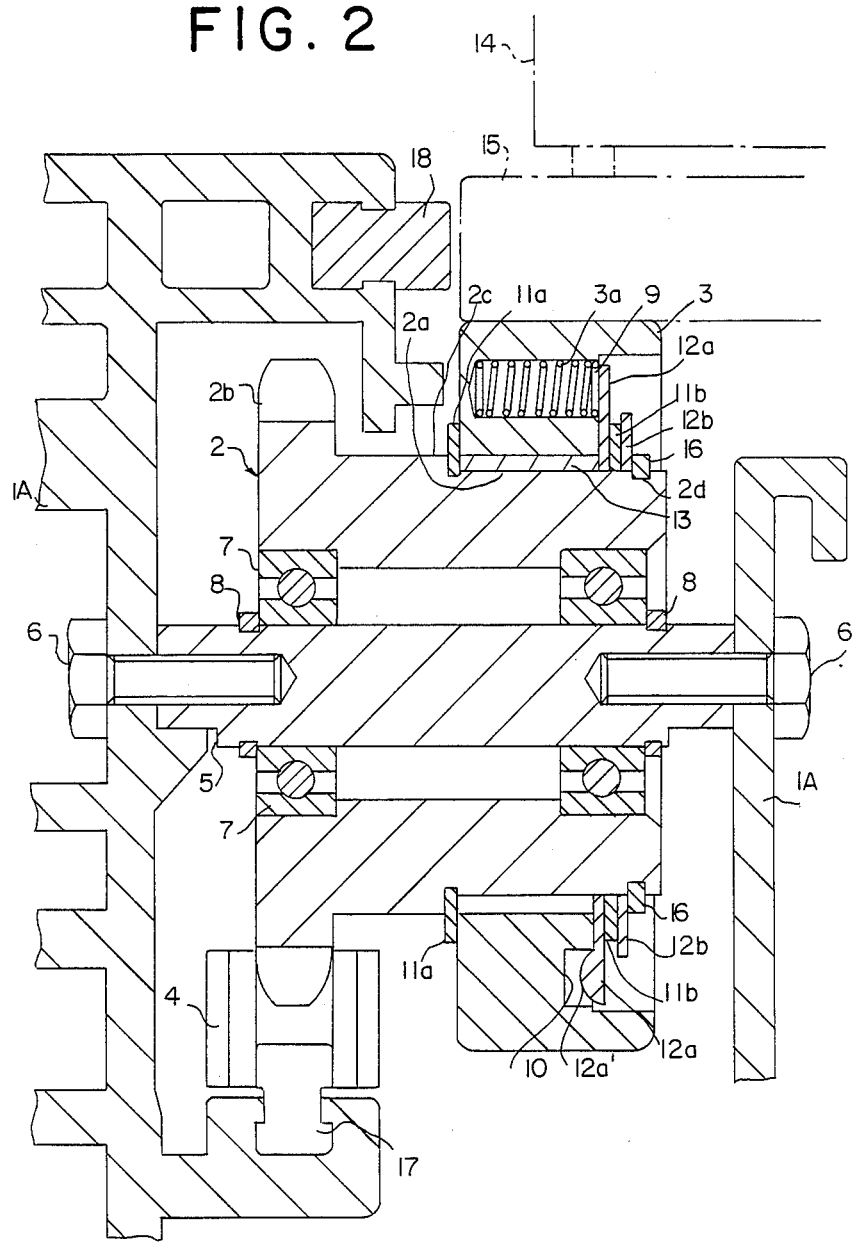
FIG. 2 is a sectional view of the present invention along line A—A of FIG. 1.

FIG. 2 shows a section through line A—A of FIG. 1. A shaft 5 is engaged to frame 1a with bolt 6. Sprocket 2, which includes roller 3 on the cylindrical portion 2a thereof, is mounted on shaft 5 through bearing 7. Shaft 5 and bearing 7 are are attached by means of a pair of snap rings 8.

A tooth portion 2b of sprocket 2 is engaged with chain 4 which moves in the form of endless track within frame 1. A stepped portion 2c, on which roller 3 is rotably mounted through a bushing 13 described below, is formed behind tooth portion 2b of sprocket 2. Groove 2d, which receives another snap ring described below, is formed at the peripheral end of cylindrical portion 2a.

Figure 3:
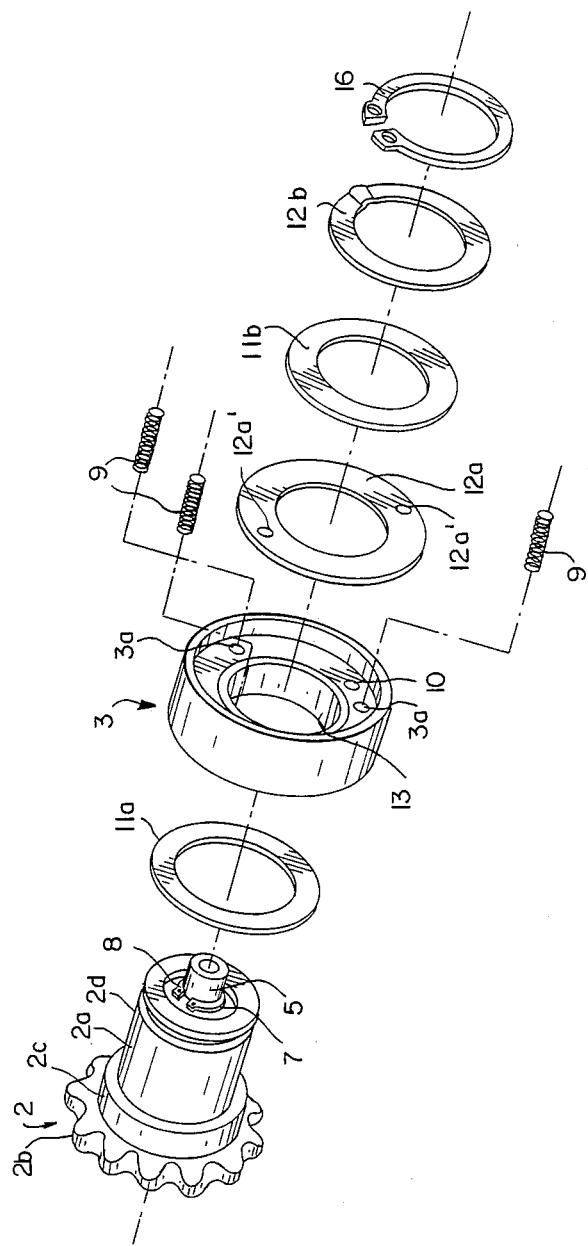
FIG. 3 is an exploded perspective view of FIG. 2.

As shown in FIGS. 2 and 3, three spring holes 3a on the inner surface of the roller 3 are provided for receiving respective springs 9. The angle between adjacent spring holes 3a is 120° with respect to the axis of the roller 3. A pair of auxiliary holes 10, are formed near two of spring holes 3a to receive the protrusion of the friction plate described below. Behind stepped portion 2c of sprocket 2, a pair of rings 11a and 11b are inserted in front of the inner surface of the roller 3, and a pair of friction plates 12a and 12b are provided on the opposite sides of ring 11b to create frictional engagement between the friction plate 12a and ring 11b.

The plastic rings 11a and 11b reduce friction and wear between roller 3 and stepped portion 2c of sprocket 2 and between friction plates 12a and 12b. Friction plate 12a includes a pair of protrusions 12a' on the side surface. Protrusions 12a' of friction plate 12a are always engaged within auxiliary hole 10 of roller 3 by the resilient force of spring 9 to rotate friction plate 12a together with roller 3.

Therefore, the outer end surface of roller 3 is in close contact with the stepped portion 2c of sprocket 2 separated only by ring 11a, and inner end surface of roller 3 contacts tightly with the friction plate 12a due to the resilient force of spring 9. Thus roller 3 revolves together with sprocket 2 by friction force created therebetween.

A bushing 13 or an oiless bearing is fitted between the inner surface of roller 3 and the outer surface of cylindrical portion 2a of sprocket 2. A snap ring 16, which is fitted in groove 2d of sprocket 2, exerts a compressive force upon friction plates 12a, 12b and ring 11b to protect against disengagement.

Pallet 15 on which the product is loaded is laid on the upper surface of roller 3, and is moved forward in response to the revolution of roller 3. A chain guide rail 17, which supports chain 4 and enables it move smoothly, extends longitudinally along frame 1. The upper portion of frame 1 is provided with another guide rail 18 made of synthetic resins. Guide rail 18 prevents deviation of pallet 15 from its transport direction.

OPERATION

If chain 4 moves forward along guide rail 18 by the driving force of a motor (not shown), sprocket 2 rotates freely on shaft 5. Thus roller 3, which is mounted on cylindrical portion through bushing 13 and snap ring 16 by the friction force created between them, rotates smoothly together with sprocket 2, since roller 3 is secured rings 11a, 11b and friction plates 12a, 12b.

Accordingly, product 14 loaded on pallet 15, is moved forward the downstream direction of the conveyor. At this time, pallet 15, which is in rolling contact with rotating roller 3, is transported in a straight line because guide rail 18 supports pallet 15 and thus maintains its transport direction.

Accordingly, the amount of noise and vibration between the drive members is remarkably reduced in comparison to a conventional conveyor. When an operator or robot wants to stop pallet 15 and to assemble supplementary components to product 14, a stopper (not shown) operates to clamp and stop pallet 15. As a result, pallet 15 remains stationary while roller 3 and sprocket 2 continue rotating.

After assembly of the supplementary components is finished by the operator or robots, the stopper releases pallet 15 and lays it down on the rotating roller 3. Accordingly, pallet 15 resumes to move forward to the next working station, i.e., downstream direction of the conveyor.

In case of conveyor overload, friction plates 12a and 12b stop the rotation of roller 3 and the forward movement of pallet 15. Specifically, when roller 3 is overloaded, the friction force between the inner surface of roller 3 and bushing 13 is greater than the compressive force of spring 9 located between friction plate 12a and ring 11b as well as between the one end surface of roller 3 and ring 11a. Because protrusion 12a' of plate 12a is tightly engaged with auxiliary hole 3a of roller 3, roller 3 and friction plate 12a stop revolving. Accordingly, pallet 15 cannot move forward and is kept at its stationary position until the conveyor line is no longer overloaded.

In other words, although springs 9 contact friction plate 12a and exert a resilient force on ring 11b, friction plate 12b, and snap ring 16, the friction force between the inner surface of roller 3 and bushing 13 overcomes said predetermined resilient force.

If the transported products do not have the same weight, a proper operation efficiency can be obtained by substituting approppriate springs 9 with springs of different spring constant to perform an efficient overload release operation against the resilient force. Also the transport speed of the pallet 15 can be adjusted by selection of the diameter of roller 3 and sprocket 2.

On the other hand, since only a small part of roller 3 contacts with pallet 15, it takes a relatively small amount of power to acquire sufficient rotation for roller 3. Also electrical error, which results from the vibration between the drive members, is remarkably reduced because the roller 3 rotates in a stationary position.

The guide rail 18 guides the pallet 15 to move straight in its transport direction. Therefore, each pallet 15 moves quitely and stops quickly. This feature produces shorter tact time and acoodingly increases productivity.

The conveyor, in accordance with the present invention, can be modified in various ways. For example a pair frames 1 which are parallel and separately formed in the present invention, can be formed integrally each other. In this embodiment, roller 3 and shaft 5 can be extended transversely to the entire width of frame 1.

The conveyor, in accordance with the present invention, solves problems which accompany the conventional conveyor, and also increases the productivity of the factory which uses robots.

I claim:

1. A roller assembly for a power free triple conveyor for transporting a pallet in a transport direction including a frame, a shaft which is fixed to the frame, a rotatable sprocket mounted on the shaft through a bearing and having first and second end portions, and a chain engaged with said sprocket at said first end portion, said chain rotating in the form of an endless track for rotating said sprocket, said roller assembly further comprising:

a roller mounted behind a stepped portion of the sprocket at said second end portion by means of a pair of rings, a pair of friction plates, a bushing located between an inner surface of the roller and an outer surface of said second end portion of the sprocket, a spring resiliently installed within a spring hole of the roller, one end of said spring bearing against one of said friction plates, a snap ring fitted in the groove of the sprocket, said snap ring exerting a compressive force upon the other of said friction plates to protect against loosening, a guide rail fixed at an upper portion of the frame, said guide rail for preventing the pallet from deviating from the pallet's transport direction.

2. A roller assembly for a conveyor as claimed in claim 1, wherein three spring holes are formed at the inner surface of the roller, wherein the angle between adjacent spring holes is 120° with respect to the axis of the roller.

3. A roller assembly for a conveyor as claimed in claim 1, wherein said one of said friction plates has a pair of protrusions on its surface.

4. A roller assembly for a conveyor as claimed in claim 1, wherein the roller comprises a pair of auxiliary holes adjacent the spring holes to receive said protrusions.

* * * * *